United States Patent [19]

Gaussa, Jr. et al.

[11] Patent Number: 4,920,548
[45] Date of Patent: Apr. 24, 1990

[54] SOURCE RANGE NEUTRON FLUX COUNT RATE SYSTEM INCORPORATING METHOD AND APPARATUS FOR ELIMINATING NOISE FROM PULSE SIGNAL

[75] Inventors: Louis W. Gaussa, Jr., Penn Township, Westmoreland County; Kingsley F. Graham, Murrysville; John B. Lipchak, Forest Hills; Lesley Greenberg, Monroeville, all of Pa.

[73] Assignee: Westinghouse Electric Corp., Pittsburgh, Pa.

[21] Appl. No.: 250,471

[22] Filed: Sep. 28, 1988

[51] Int. Cl.$^5$ ............................................. G21C 17/00
[52] U.S. Cl. .................................. 376/255; 250/336.1; 364/574
[58] Field of Search ....................... 376/254, 255, 215; 250/388, 336.1, 374; 364/527, 572, 574

[56] References Cited

U.S. PATENT DOCUMENTS 4,582,672  5/1986  Tuley, Jr. et al. .................. 376/254
4,587,620  5/1986  Niimi et al. .......................... 364/574
4,670,891  6/1987  Salowe et al. ........................ 377/20

Primary Examiner—Daniel Wasil
Attorney, Agent, or Firm—B. R. Nath

[57] ABSTRACT

In a method and apparatus for reducing the effects of frequency burst noise and noise spikes accompanying a random pulse signal, pulses with an amplitude above a high threshold or below a low threshold are eliminated, with the remaining pulses of intermediate amplitude being statistically filtered. The statistical filter compares the current pulse count rate signal to maximum and minimum statistical limits generated from the recent average value of the pulse count rate using Poisson statistics, and clamps the output to the limit which is exceeded. If the pulse count rate is between the statistical limits, it is used as the output pulse count rate signal. If the statistical limits are exceeded for a designated interval indicative of a true change in the pulse count rate, clamping of the output signal is overridden so that the true change in pulse count rate can be tracked. Statistical filtering is resumed when the current pulse count rate is again within the statistical limits.

20 Claims, 6 Drawing Sheets

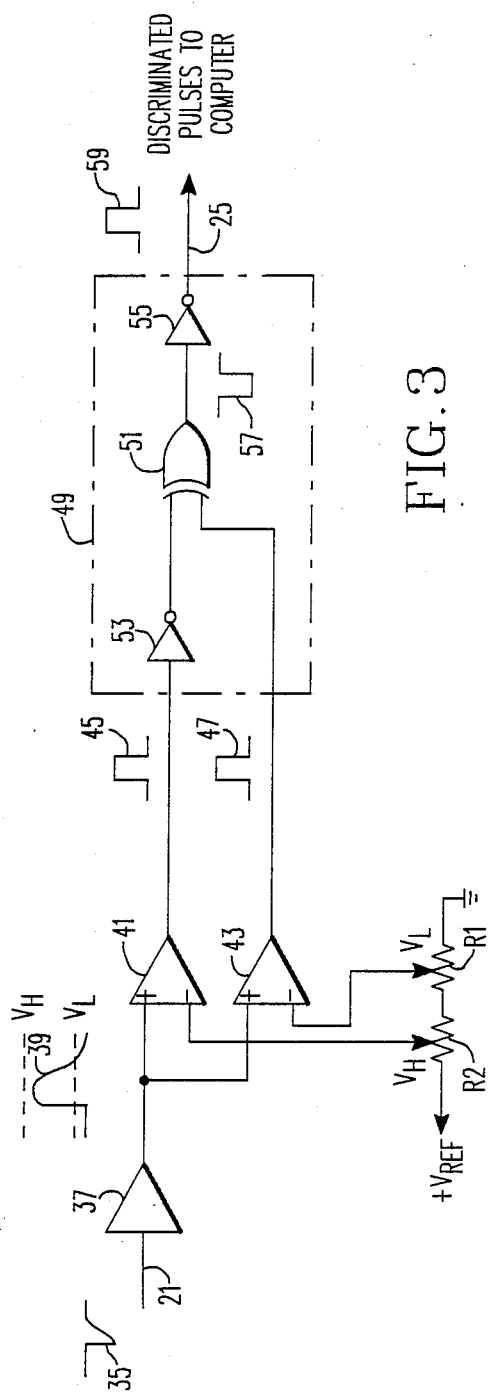
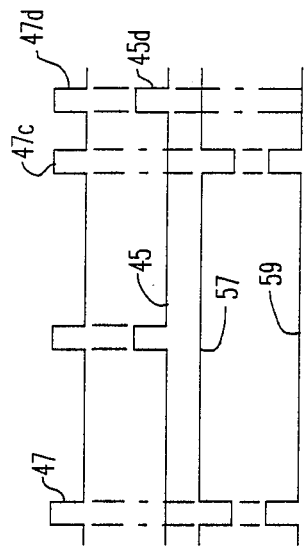
FIG. 3
FIG. 4

SOURCE RANGE NEUTRON FLUX COUNT RATE SYSTEM INCORPORATING METHOD AND APPARATUS FOR ELIMINATING NOISE FROM PULSE SIGNAL

BACKGROUND OF THE INVENTION

Field of the Invention

This invention relates to a system for generating a reliable neutron count rate for the random emission of neutrons in a subcritical nuclear reactor. The invention incorporates a method and apparatus for the elimination of noise from such a pulse signal.

Background of the Invention

Neutron emission in a subcritical nuclear reactor is monitored to determine the power level, to assure that an event is not taking place which would result in the reactor unintentionally going critical, and to regulate reactivity during start-up. It is important that a reliable measure of neutron emission be available to perform these functions.

The task of generating such a reliable measure of neutron emission is made difficult by the fact that the rate of neutron emission in a subcritical reactor is so low that it is a random event. That is, there are frequent bursts of neutrons occurring between periods of little or no activity. It is known to utilize Poisson statistics to predict the neutron count rate in nuclear reactors for design and analysis purposes.

The sensors used in what is known as the source range instrumentation to detect neutron emissions in a subcritical reactor generate a pulse in response to each emission. These pulses are counted over recurring periods of time to generate a neutron pulse count rate. Unfortunately, the amplitude of the pulses generated by these sensors is not very high compared to the considerable noise that can be present. There are many sources of such noise. Since the signal level is so low, electronic noise from circuit components in the measuring system can be a factor. Also, gamma rays can trigger pulses in some sensors. The electronic noise and gamma ray noise tend to be lower in amplitude than the pulses produced in the sensor by neutrons. Other types of noise induced by outside events such as the operation of motors or other electrical equipment can result in large amplitude spikes in the neutron detection channels.

Noise has two kinds of effects on the signal generated in the neutron detector circuits. One effect is frequency bursts which can result in erroneous high count rates which can produce a spurious alarm and/or an unnecessary response. The other effect is to mask or obliterate the true count rate, resulting in an erroneous low count rate reading.

U.S. Pat. No. 4,582,672 discloses a system for detection of conditions which could lead to inadvertent critically in a nuclear reactor. In this system, the pulse signal from a neutron detector is converted to a logarithmic analog signal which is then pulse modulated for input into a digital computer. The computer continually generates average neutron count rate signals for incremental time periods and stores them for a preselected time period. At the end of each incremental time period, the latest average count rate signal is compared with the oldest, and preferably each of the intervening stored values, and if it exceeds any of them by a preselected multiplication factor, an alarm is generated. Specifically, the system is adapted to detect a boron dilution event.

While this system, to some extent, reduces the effect of frequency burst noise, further improvement is desirable. The system of U.S. Pat. No. 4,582,672 also does not deal with noise spikes which could mask the true neutron count rate.

There is a need therefore for an improved system for determining the neutron count rate in a subcritical nuclear reactor.

There is a more particular need for such a system which better filters out noise from the pulse signal.

There is a further need for such a system which filters both noise bursts and noise spikes from the pulse signal.

There is additional need for such a system which provides an indication of the quality of the pulse signal being generated.

There is also a need for such a system which limits deviations in the pulse count rate based upon the recent history of the pulse count rate signal.

There is a related need for such a system which will, however, allow the pulse count rate to track with reasonable accuracy true changes in the pulse count rate.

SUMMARY OF THE INVENTION

These and other needs are satisfied by apparatus and a method for reducing the effects of frequency burst noise and noise spikes in a random pulse signal, and especially the random neutron pulse signal in a subcritical nuclear reactor, by eliminating pulses having an amplitude less than a low threshold set to eliminate gamma pulses and electronic noise and greater than a high threshold set to eliminate noise spikes, and statistically filtering the remaining pulses to reduce the effects of frequency burst noise.

The statistical filtering comprises generating maximum and minimum statistical limits for the current pulse count rate from previous values of the pulse count rate. In the preferred embodiment, the standard deviation of the average value of the pulse count rate in the most recent time period of predetermined duration is multiplied by a multiplication factor and added to the most recently calculated average value of the count rate to generate the maximum statistical limit, and subtracted from this average count rate to generate the minimum statistical limit. The multiplication factor is selected to provide a desired probability of the current count rate falling within the limits.

If the current pulse count rate is between the statistical limits, the current pulse count rate is passed through as the output pulse count rate. However, if the current pulse count rate exceeds the maximum statistical count rate, the output is clamped to this maximum statistical limit. Similarly, the output is clamped to the minimum statistical count rate, if the current pulse count rate is less than this minimum, with an absolute minimum pulse count rate of zero.

If the current pulse count rate remains outside the statistical limits for a designated interval, indicative of a true change in the pulse count rate, clamping of the output signal to the statistical limits is overridden and the current output pulse count rate signal becomes the output signal. This permits the system to track large true pulse count rate changes. Calculation of the statistical limits continues and when the current pulse count signal is again within the statistical limits, statistical filtering resumes.

BRIEF DESCRIPTION OF THE DRAWINGS

A full understanding of the invention can be gained from the following description of the preferred embodiments when read in conjunction with the accompanying drawings in which:

FIG. 3 is a schematic diagram of a signal processor which forms a part of the invention.

FIG. 4 is a waveform diagram illustrating operation of the signal processor of FIG. 3.

DESCRIPTION OF THE PREFERRED EMBODIMENTS

Figure 1:
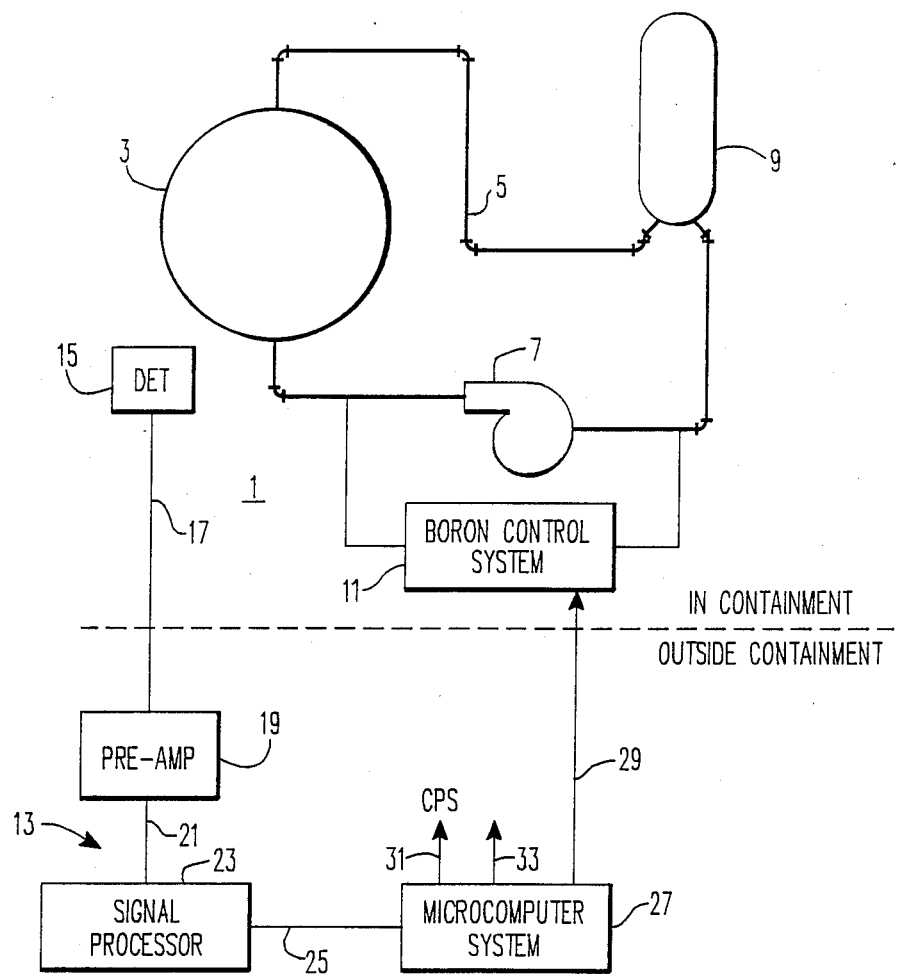
FIG. 1 is a schematic diagram of a pressurized nuclear reactor incorporating the invention.

FIG. 1 illustrates application of the invention to a pressurized water nuclear reactor (PWR) 1. It will be understood by those skilled in the art that the invention has application to other types of nuclear reactors, and indeed, that aspects of the invention have application to other types of systems wherein it is desirable to extract a pulse rate from a pulse signal made up of randomly occurring pulses which are accompanied by noise.

The PWR 1 includes a reactor 3 in which controlled nuclear fission reactions generate thermal energy to heat reactor coolant which is circulated through a primary loop 5 by circulating pumps 7. Heat is extracted from the reactor coolant in a steam generator 9 in the primary loop 5 to generate steam which is circulated in a secondary loop (not shown) to generate electric power in a steam turbine. Long term reactivity levels in the reactor are controlled by a neutron absorbant material such as boron dissolved in the reactor coolant. A boron control system 11 regulates the boron concentration in the reactor coolant. An example of a boron control system is described in U.S. Pat. No. 4,582,672 which can be referred to for the details of a suitable system. One of the functions of the boron control system is to assure that a shut-down reactor remains subcritical.

The power level of the reactor 3 is measured by monitoring the neutron flux. Due to the wide range in power level between shut-down and operation at 100% power, three separate neutron flux measuring systems are commonly utilized. The system used at the low end of the power range is designated the source range instrumentation. As mentioned, at these low levels of power, neutron emission is a random event. The source range instrumentation system 13 includes a source range detector 15 which generates electrical pulses in response to neutron emissions. One commonly used type of source range detector 15 is a BF3 (Boron Trifloride) neutron detector located adjacent the reactor vessel 3. Each neutron transiting the gas filled tube of the detector generates a pulse. This pulse signal is transmitted over lead 17 to a preamplifier 19 located outside of reactor containment. Preamplifier 19 amplifies the pulse signal and transmits it over lead 21 to a signal processor 23. As will be more fully discussed below, the signal processor in accordance with the invention eliminates noise spikes from the pulse signal. The pulse signal with the spikes removed is then transmitted over lead 25 to a microcomputer system 27. The microcomputer system generates a filtered pulse rate signal in accordance with the teachings of the invention. The computer 27 can also generate from this pulse rate signal a flux doubling signal which is transmitted to the boron control system 11 over the lead 29. While the pulse rate signal generated by the invention is filtered to reduce the effects of noise, it is still a random signal. The microcomputer system 27 runs a routine such as that described in U.S. Pat. No. 4,670,891 which smooths out the random neutron count signal to generate a count per second signal (CPS) which is transmitted to a control system (not shown) over a lead 31. The microcomputer system 27 can also calculate a start up rate signal from the CPS signal which is provided over a lead 33 to the control system for use in regulating reactivity as the reactor goes critical in a manner known in the art.

Figure 2:
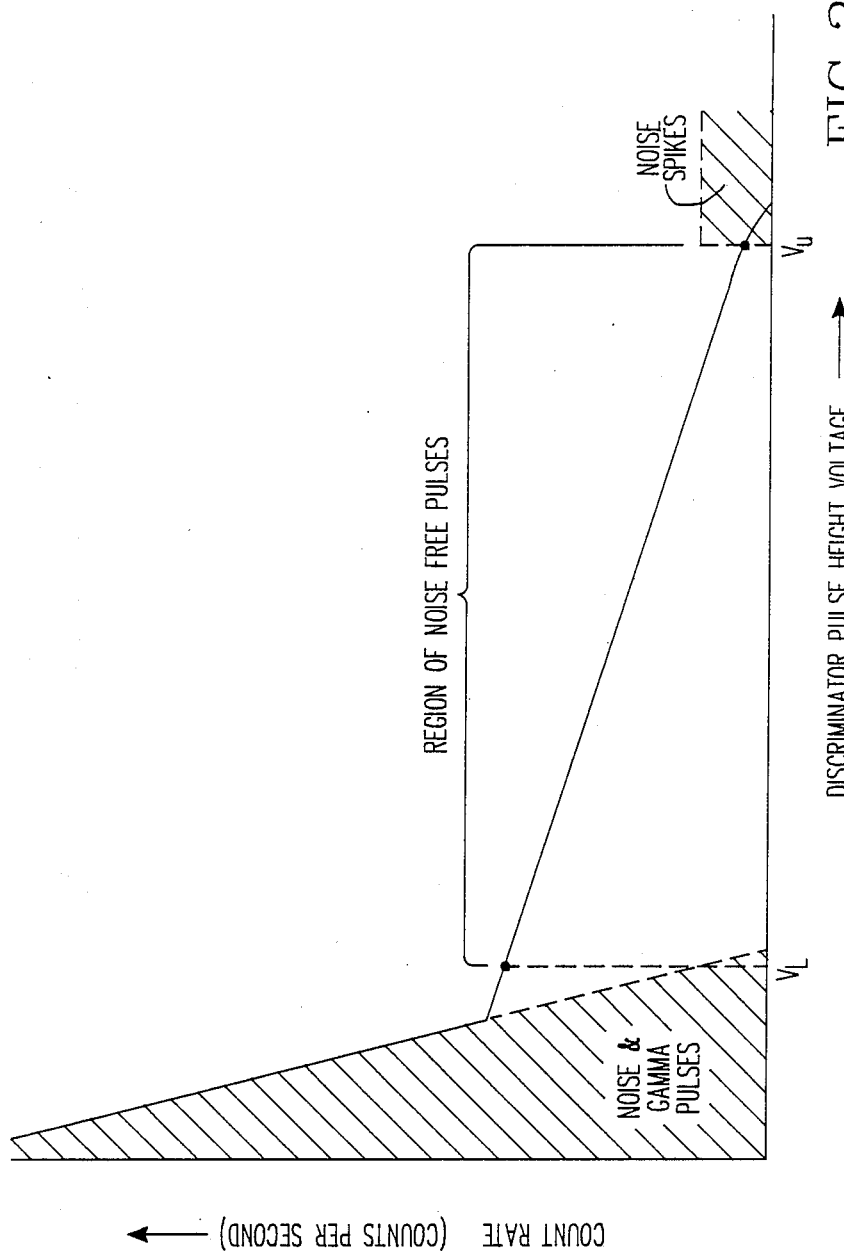
FIG. 2 is a diagram illustrating the relative amplitudes of the neutron pulse signals counted by the invention and the various types of noise which the invention filters out.

The signal from the preamplifier 19 is very noisy. The noise comprises low amplitude noise including gamma pulses generated in the detector 15 by gamma radiation and electronic noise. The pulse signal from preamplifier 19 also includes voltage spikes which can be caused by motors such as the cranes in the refueling machine which can be in operation when the reactor is shut down. FIG. 2 is a plot of pulse height voltage versus counts per second showing that the neutron pulse height falls between that of the gamma pulses and electronic noise at the low end and the noise spikes at the high end.

In accordance with one aspect of the invention, low amplitude noise and the noise spikes are isolated by eliminating all signals below a low threshold set above the amplitude of the known low amplitude noise and by eliminating pulses greater in amplitude than a high threshold set above the expected amplitude of neutron pulse signals. By subtracting the pulses which exceed the high threshold from those which exceed the low threshold, a pulse signal is generated representing only those pulses that have an amplitude which falls between the high and low thresholds.

The noise present in the signal generated by the preamplifier 19 also includes frequency bursts. While the pulses generated by neutron emission in a subcritical reactor follow a Poisson distribution, the noise bursts do not and are typified by a large number of counts over a short time interval. We have discovered that by applying what we call a Poisson statistics filter to the signal generated by preamplifier 19, we can detect the onset of false count rate increases due to sporadic noise bursts and reduce their effect on the measured count rate.

Using statistics, we determine within a given probability what the pulse count rate should be within a given time interval based upon what the average count rate has been in previous intervals. Because the neutron emission process in the subcritical reactor obeys Poisson statistics, the average number of counts or events in an interval can be calculated as M and the standard deviation can be calculated as:

$$\sigma = M^{\frac{1}{2}} \qquad \text{Eq. 1}$$

In accordance with this aspect of our invention, we reject high count rate increases in the current time interval, $T_n$, if the incoming count rate exceeds statistical maximum and minimum count rate limits. These maximum and minimum statistical count rate limits are calculated as follows using the Gaussian and normal distribution which is an approximation of the Poisson distribution:

$$C_{imax} = M_c + a\sigma \qquad \text{Eq. 2}$$

$$C_{imin} = M_c - a\sigma \qquad \text{Eq. 3}$$

where:
- $C_{imax}$ = maximum statistically expected incoming counts in interval n
- $C_{imin}$ = minimum statistically expected incoming counts in interval n
- $M_c$ = average counts derived from previous intervals
- $\sigma$ = standard deviation from equation 1
- $a$ = multiplier for adjusting probability to desired level.

If the count rate for the current interval $C_n$ is greater than or equal to the maximum statistically expected count rate $C_{imax}$, the count rate is "clamped" to the value of $C_{imax}$. Similarly, if $C_n$ is less than or equal to the minimum statistically expected count, $C_{imin}$, the count is "clamped" to this minimum statistical limit. The multiplication factor $a$ determines the degree of probability of the count rate attributable to neutron emission for the current interval falling between the maximum and minimum statistical limits. For instance, with $a$ equal to 1.96, there is a 95% probability that the count rate for the current interval will fall within the given limits. On the other hand, with $a$ equal to 2.8, there is a 99.5% probability that the current count rate due to neutron emissions will fall within the calculated statistical limits.

Frequency burst noise increases the count rate in a given interval. Under these circumstances, the statistical maximum count rate prevents the pulse count rate signal from becoming excessively high. On the other hand, noise spikes which exceed the high threshold in the signal processor 23 are eliminated, which can mask the true count. In fact, the noise spikes can result in a count of zero for a given interval. The statistical minimum count rate is substituted when the measured count rate drops below this limit to maintain the continuity of the neutron pulse count rate signal.

In the preferred form of the invention, the average count rate used in calculating the statistical deviation, is the count rate over a current interval of a selected duration. In the exemplary system, this is the most recently calculated one minute interval, although this one minute average signal is recalculated every 15 seconds. The three most recent one minute intervals are retained for use in the boron dilution routine. While the current one minute average is used in the exemplary system, for a source range neutron detection system, this interval could for instance vary from about $\frac{1}{4}$ second up to about four minutes.

The Gaussian approximation is a valid approximation for count rates above about 20 counts per second. Since the count rate in a subcritical reactor varies greatly, but can be as low as 2 or 3 counts per second, the interval of one minute (calculated every fifteen seconds) used in the exemplary system achieves valid results. If faster response times are desired, the following more exact Poisson distribution should be used:

$$P(x) = \frac{M^x \cdot e^{-M}}{X!} \qquad \text{Eq. 4}$$

where:
- M = mean value of count rate from previous intervals
- X = specific number of counts in current interval
- P(x) = probability that exactly X events will occur in an interval where expected number is M The lower limit for the count rate is then calculated as follows:

$$\sum_{X=0}^{X_L} P(x) = y \qquad \text{Eq. 5}$$

where:
- y = desired probability
- $X_L$ = lower limit of count rate

In accordance with equation 5, the probabilities for the occurrences of each number of counts up to $X_L$ calculated using Equation 4 are summed to determine what value of $X_L$ results in the probability y.

Similarly, the upper limit for the count rate is calculated in accordance with the relationship:

$$\sum_{X_U}^{X=\infty} P(x) = Y \qquad \text{Eq. 6}$$

where: $X_U$ = upper count rate

It can be seen that while Equation 6 calls for a summation to infinity, the summation of the calculations from equation 4 converges on the value y after only a few calculations.

For a 95 percent probability that the count rate in a given interval will fall between the upper and lower limits, y would be 0.025.

Clearly, the Gaussian approximation utilizing equations 2 and 3 is more easily implemented, however, where response time requires it, the more exact Poisson distribution can be implemented in present day microcomputers.

If the level of reactivity in the reactor changes sufficiently rapidly, it is obvious that the current pulse rate signal will fall outside of the statistical maximum and minimum pulse count limits. Thus, in order for the system to be able to track such changes in reactivity, if the current pulse count rate remains outside of the statistical maximum and minimum limits for more than a designated interval of time, the filtering is turned off and the output signal is allowed to follow the input count rate signal. This designated interval of time is selected to be long enough to reduce the likelihood of an erroneous alarm due to noise, but short enough that there is adequate sensitivity to significant changes in neutron emission. In the exemplary system, this designated interval is ten seconds.

While the current count rate signal remains outside the statistical limits, the averages and the new statistical limits are continually updated. When the rate of change of neutron emission slows down and the current pulse count signal again falls within the statistical limits, filtering is resumed. For subsequent excursions outside of the statistical limits, the output signal is "clamped" to the appropriate statistical limit until again the current signal exceeds the limits for more than the designated interval. For moderate changes in the true neutron count rate, this could result in a stairstep filtered output signal.

FIG. 3 illustrates the details of the exemplary signal processor 23. The incoming pulses 35 received from the source range detector 15 over lead 21 are not sharply defined. They are applied to an amplifier 37 which inverts the negative pulses in addition to increasing the amplitude to produce pulses 39. These amplified pulses 39 are applied to the non-inverting inputs of a high threshold discriminator 41 and a low threshold discriminator 43. The pulses are compared in discriminator 41 with a high threshold reference voltage $V_H$ generated at the tap on potentiometer $R_2$ of the voltage divider comprising the positive reference voltage source $V_{ref}$ and potentiometers R1 and R2. Similarly, the pulses 39 are compared in the discriminator 43 with the low threshold voltage $V_L$ generated at the tap on potentiometer R1. The discriminator 41 and 43 generate square pulses 45 and 47 when the pulses 39 exceed the high and low threshold voltages respectively.

The high threshold pulse signal is subtracted from the low threshold pulse signal to generate a pulse signal from which the noise spikes have been eliminated. This subtraction can be carried out by the subtractor circuit 49 provided in the signal processor 23. The subtraction circuit includes an exclusive OR circuit 51. The low threshold pulse signal 47 is applied to one input of the exclusive OR circuit 51 directly. The high threshold pulse signal 45 is applied to another input of the exclusive OR circuit 51 through an inverter 53. The output of the exclusive OR circuit 51 is inverted by inverting amplifier 55 to produce the pulses 59 which are applied to the microcomputer system 27 over the lead 25. Operation of the subtractor can be appreciated more fully from reference to the waveform diagram of FIG. 4. As can be seen from this figure, because of the inverter 53, one input to the exclusive OR is high and the other is low to produce a high output, waveform 57, and hence a low level signal 59, except when there is an output pulse 47 from the low threshold discriminator 43, but not from the upper threshold discriminator 41. Under these conditions, both inputs to the exclusive OR circuit are high and the output goes low to generate a pulse in the signal 59. Thus, pulses 59 only appear on lead 25 for pulses 35 which fall between the low and high threshold settings of the discriminators 43 and 41 respectively.

This subtraction carried out by the subtractor circuit 49 can alternatively be performed by software in the microcomputer system 27. In such case, both the signals 45 and 47 would be applied to the microcomputer system 27.

Figure 5:
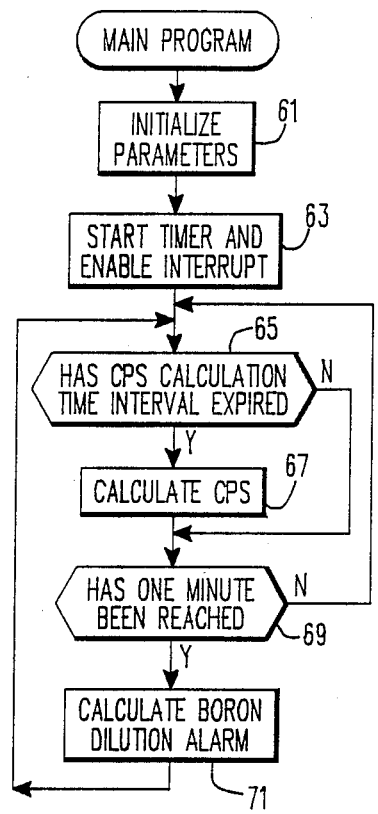
FIG. 5 is a flow chart of a suitable main computer program which can be used to implement the invention.
Figure 7:
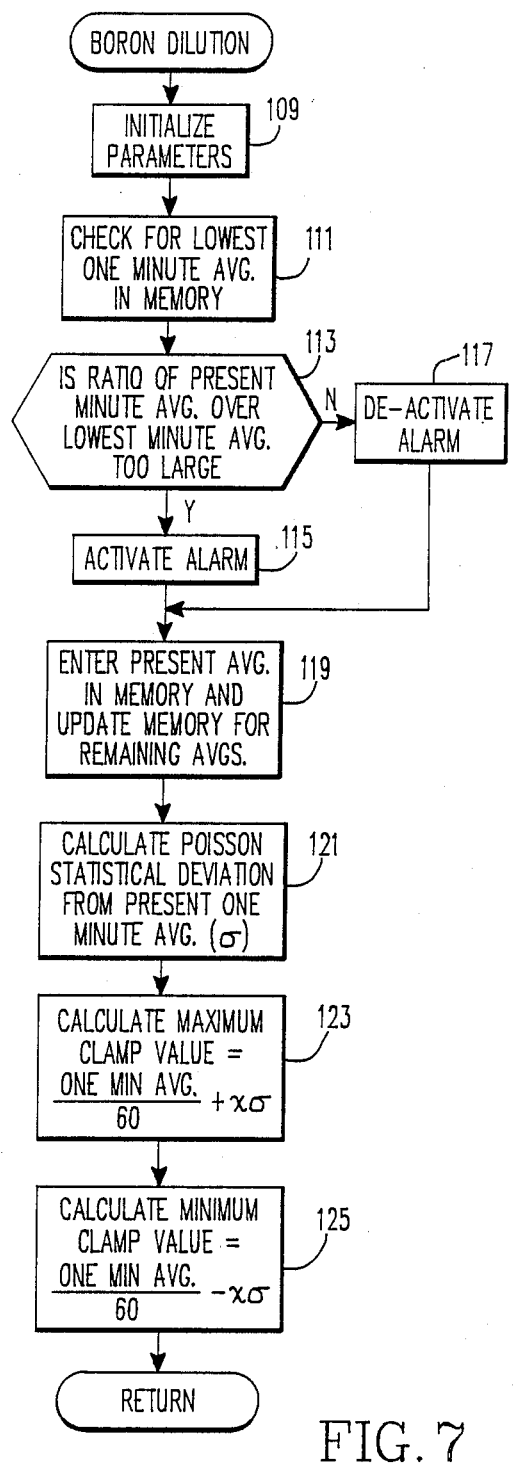
FIG. 7 is a flow chart of a suitable boron dilution program which can be called by the main program to implement the invention.
Figure 6:
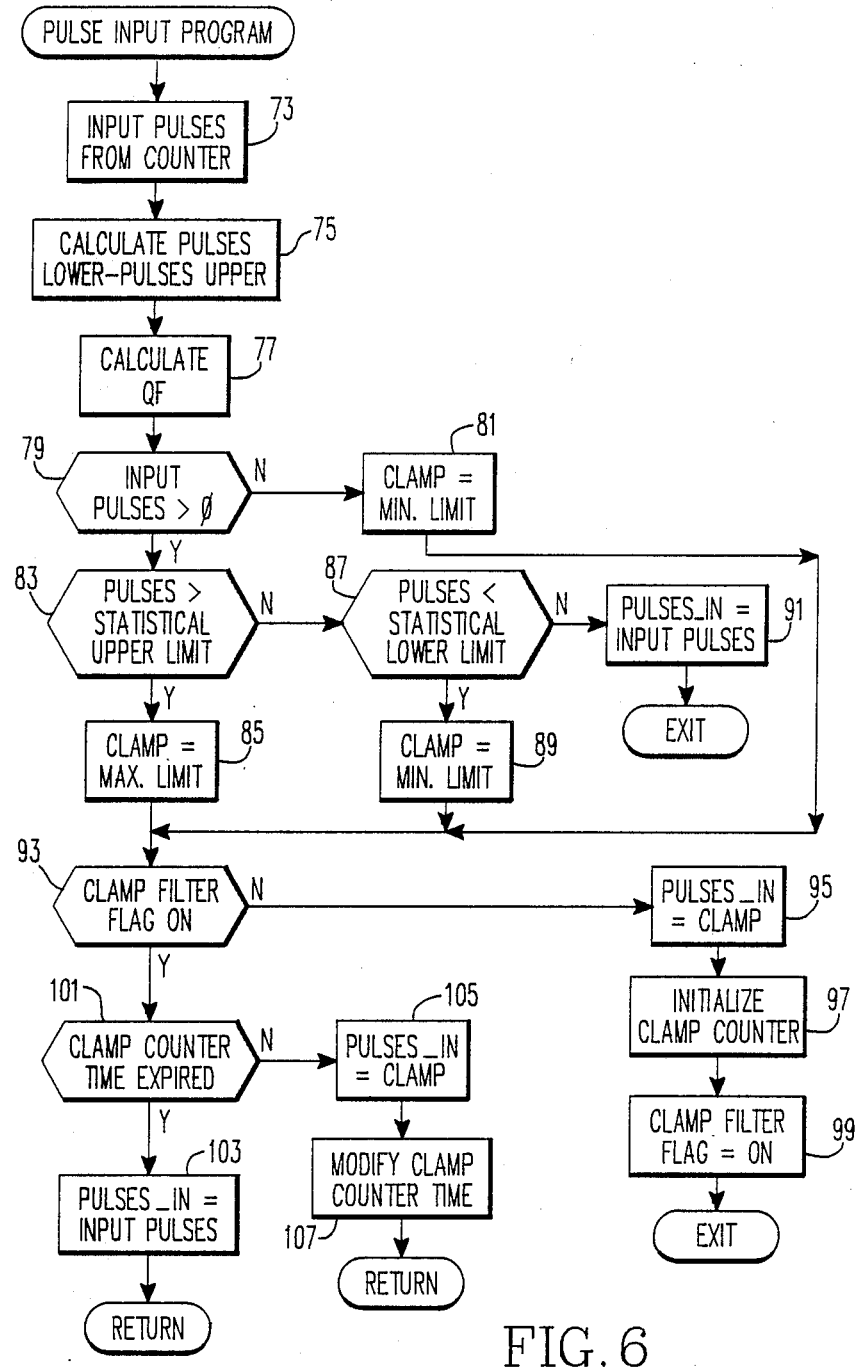
FIG. 6 is a flow chart of a suitable interrupt program which can be used with the main program of FIG. 5 to implement the invention.

Flow charts for a suitable software program to generate a filtered pulse count rate signal for the PWR 1, including generation of the count rate per second signal supplied on lead 33 and flux doubling signal provided to the boron control system 11 over lead 29 are illustrated in FIGS. 5, 6 and 7.

FIG. 5 illustrates the main program which initializes the various parameters at 61 when first entered. In further preparation for calculating the count rate, the main program timer is started and the interrupt program is enabled at 63. The main program then enters a set of nested loops. If the interval for calculation of the counts per second signal has expired at 65, the CPS signal is calculated at 67. In the exemplary system this occurs every ½ second. The CPS signal, which is a statistically smoothed count pulse signal, is generated by calling the routine disclosed in U.S. Pat. No. 4,670,891. This CPS routine can in turn call a routine for generating the start-up rate from the CPS signal. Whether or not CPS is calculated, a determination is made at 69 whether the 15 second interval for calculating the boron dilution alarm has expired. If it has, the boron dilution routine of FIG. 7 is called at 71. The main program repetitively generates updated CPS signals and calls the boron dilution routine.

A suitable flow chart for the interrupt routine which executes on every interrupt interval, set at ⅛ second in the exemplary system, is shown in FIG. 6. First, the input pulses from counters in the microprocessor system 27 are read at 73. Since the interrupt program is run precisely every ⅛ seconds, the counts accumulated in each cycle represent a count rate. In some computers, the counters are reset automatically each time they are read. In others, the current count must be subtracted from the previous count to determine the number of counts during the current interrupt interval. Where the subtractor circuit 49 of FIG. 2 is not utilized, counters maintain separate counts of the pulses 45 and 47. The count of pulses 45 during the current interrupt interval from discriminator 41 in FIG. 2 is subtracted from the count of 47 pulses from the lower discriminator 43 at 75, and a quality factor QF is calculated at 77 in accordance with the following formula:

$$Q.F. = \left(1 - \frac{\text{Pulses lower} - \text{Pulses upper}}{\text{Pulses lower}}\right) 100\%$$

This quality factor provides an indication of the reliability of the pulse count rate signal being generated. The more noise spikes present, the poorer the signal reliability, and hence the lower the quality factor. This informs the operator of the level of noise present and allows him to make a judgement as to how much reliance he wants to place on the count rate signal being generated.

Next a determination is made at 79 whether the count of input pulses calculated at 75 is more than zero. If not, a parameter "clamp" is set to the minimum statistical limit at 81. This would occur where noise spikes completely mask the neutron count in a given interval. If this is not the case, the pulse count is compared with the statistical upper limit at 83 and "clamp" is set at 85 to that limiting value if the limit is exceeded. If the count is less than the upper limit and also less than the lower statistical limit as determined at 87, "clamp" is set to the lower statistical limit at 89. If the pulse count rate is between the upper and lower statistical limits, the pulse count rate is set at 91 to the count rate calculated at 75, and the interrupt program is exited.

If the count rate is outside either limit, a determination is made at 93 whether the count rate was outside the limits on the previous execution of the interrupt program. If not, the pulse count rate is set at 95 to the clamped value, a clamp counter is initialized at 97 and a "clamp filter" flag is set at 99 before the program is exited.

If the pulse count rate has been clamped to a limiting value on the previous execution of the interrupt program, the clamp counter is checked at 101 to determine if the count rate has remained outside the limits for the designated interval, which it will be recalled, is 10 seconds in the exemplary system. If the interval has expired, clamping of the count rate signal is overridden and the output is permitted to follow the input count rate at 103 since this is an indication that there is a real change in the count rate. If the clamp interval has not expired, the pulse count rate is set to the clamped value in 105 and the clamp counter is indexed at 107.

Once each 15 seconds, the main program calls at 71, the boron dilution routine which is summarized in FIG. 7. After initialization of program parameters at 109 the lowest among the three most recent one minute pulse count averages stored in memory is identified at 111. The ratio of the current one minute count rate average to this lowest average is calciated at 113 and if it exceeds a preselected value an alarm is set at 115, or if not the alarm is deactivated at 117. Next, the parameters for detecting a boron dilution event are fully discussed in U.S. Pat. No. 4,582,672. The current average pulse count rate for the last minute is then entered into memory at 119 and the oldest average is discarded so that the three most recent values are retained. The Poisson statistical deviation $\sigma$ is calculated at 121 from the current one minute average (divided by 60) in accordance with Equation 1 above. The maximum and minimum statistical limits are then calculated at 123 and 125 in accordance with equations 2 and 3, respectively, before the program returns to the main program.

Figure 8:
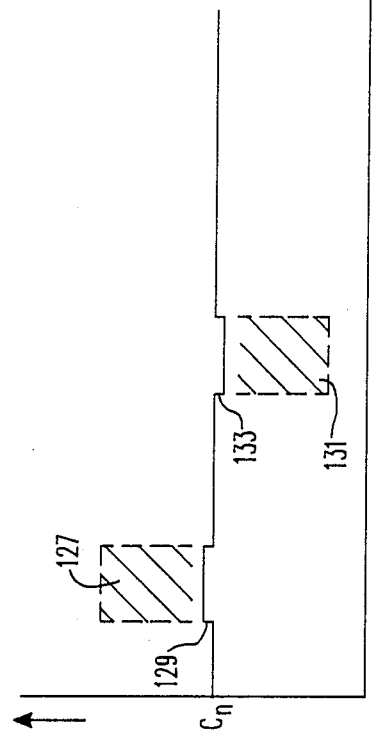
FIG. 8 is a plot showing how the invention reduces the effects of noise on the neutron pulse count signal generated in accordance with the invention for the nuclear reactor shown in FIG. 1.
Figure 9:
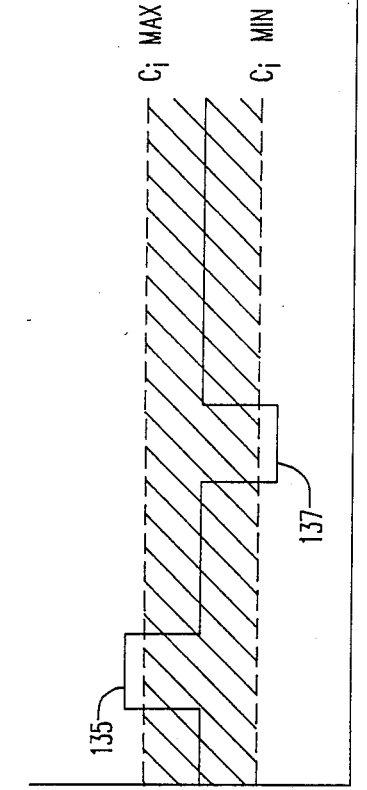
FIG. 9 is a plot showing the effect of the maximum and minimum statistical limits generated and applied in accordance with the invention on noise present in neutron pulse signals generated for the reactor of FIG. 1.

The effects of the statistical filter of the invention are illustrated in FIGS. 8 and 9. FIG. 8 shows how the count pulse signal goes almost unaffected by noise because of the filter. Instead of the rise 127 in the counts per second level due to noise, the signal $C_n$ exhibits only a minor increase at 129. Similarly, instead of a large decrease in counts per second at 131 in response to noise which masks the true count rate, the $C_n$ signal remains relatively stable and only drops slightly as indicated at 133.

FIG. 9 illustrates how the maximum statistical limits $C_{imax}$ reduces the effects of frequency burst noise 135, of a duration less than the designated interval indicative of a true change in the neutron emission rate, and how the minimum statistical limit $C_{imin}$ limits the masking of the true neutron pulse count rate by noise spikes 137.

In summary, for each interrupt interval of $\frac{1}{8}$ seconds in duration in the exemplary system, the pulse count rate for that interval is compared with statistical high and low limits. The statistical limits are determined by calculating the standard deviation of the count rate during the most recently calculated one minute interval, with this most recent one minute interval being updated every 15 seconds. The upper and lower statistical limits are determined by adding to and subtracting from the most recent one minute count rate respectively, the standard deviation multiplied by a multiplication factor. If the input pulse count rate signal is between these limits, it is used as the output. Otherwise, it is clamped at the statistical limit which is exceeded. If a statistical limit is exceeded for more than ten seconds, the statistical filter is turned off and the signal follows the input count rate. Filtering is still provided, however, to eliminate pulses below the low threshold and spikes above the high threshold. When the pulse count rate returns to within the statistical limits, statistical filtering resumes.

The present invention provides filtering of both high and low amplitude noise as well as noise bursts form random pulse signals. While it has particular application, the nuclear reactor source range pulse counting systems, it can readily be applied to other random pulse counts systems.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. Apparatus for generating nuclear reactor source level neutron pulse count rates selectively filtered to reduce frequency burst noise, said apparatus comprising:

detector means generating a pulse signal representative of neutron emissions and containing frequency burst noise;

pulse count rate signal generating means repetitively generating a pulse count rate signal from said pulse signal representative of pulses counted in a time interval of selected duration, with the pulse count rate signal for the most recent interval being the current pulse count rate signal;

pulse count rate signal limit generating means generating from previous values of said pulse count rate signal a statistical limit inside of which said current pulse count rate signal should statistically remain within a preselected probability;

comparison means comparing said current pulse count rate signal with said statistical limit; and output generating means including means generating a selectively filtered pulse count rate signal having a value of said current pulse count rate signal when said current pulse count rate signal is inside of said statistical limit and clamping means clamping said selectively filtered pulse count rate signal to said statistical limit when said current pulse count rate signal is outside said statistical limit.

2. The apparatus of claim 1 wherein said limit generating means comprises means for generating at least an approximation of Poisson statistics high and low statistical limits inside of which said current pulse count rate signal should statistically remain within said preselected probability, wherein said comparison means compares said current pulse rate signal to both said high and said low statistical limits and wherein said output generating means generates a filtered output signal which is clamped to said high statistical limit when said current pulse rate signal exceeds said high statistical limit and which is clamped to said low statistical limit when said current pulse rate signal is less than said low statistical limit.

3. The apparatus of claim 2 wherein said output generating means includes override means responsive to said comparison means and overriding clamping of said filtered pulse count rate signal by said clamping means when said current pulse count rate signal remains outside said statistical limits for longer than a designated time interval, whereby a filtered output signal having a value equal to the current pulse rate signal is generated even though said current pulse rate signal exceeds said statistical limits, so that said apparatus responds to rapid valid variations in the rate of neutron emissions.

4. The apparatus of claim 2 wherein said limit generating means includes means generating an average pulse count rate signal from values of the filtered output signal over a most recent time period of predetermined duration, and means generating said statistical high and low limits from said average pulse count rate signal.

5. The apparatus of claim 4 wherein said means for generating said high and low statistical limits from said average pulse count rate signal includes means generating a standard deviation of said average pulse count rate signal and means generating said high statistical limit as said average pulse count rate signal plus a selected multiplication factor times the standard deviation, and generating said low statistical limit as said average pulse count rate signal minus said multiplication factor times said standard deviation with an absolute limit of zero for said low statistical limit.

6. The apparatus of claim 5 wherein said output generating means includes override means responsive to said comparison means overriding clamping said filtered pulse count rate signal by said clamping means when said current pulse count rate signal remains outside said statistical limits for longer than a designated time interval whereby a filtered output signal having a value equal to the current pulse rate signal is generated even through said current pulse rate signal exceeds said statistical limits so that said apparatus responds to rapid valid variations in the rate of neutron emissions.

7. The apparatus of claim 6 wherein said output generating means includes means disabling said override means when said current pulse rate signal again falls inside of the statistical limits.

8. The apparatus of claim 7 adapted for use with pulse signals containing noise spikes, said apparatus including:
means comparing said pulse signal generated by said detector means to a low threshold signal and a high threshold signal and generating a low threshold count signal comprising pulses of said pulse signal which exceed said low threshold signal set to eliminate low amplitude noise and generating a high threshold count signal comprising pulses of said pulse signal which exceed said high threshold signal set to pass high amplitude noise; and
means subtracting said high threshold count signal from said low threshold count signal to generate a processed pulse signal, said rate signal generating means generating said pulse count rate signal from said processed pulse signal.

9. The apparatus of claim 8 including calculating means calculating a quality signal as a function of the ratio of the high threshold count signal to the low threshold count signal.

10. Apparatus for generating nuclear reactor source level count rates filtered to reduce noise spikes and low amplitude noise comprising:
detector means generating a pulse signal representative of neutrons emissions and containing low amplitude noise and noise spikes;
means comparing said pulse signal generated by said detector means to a low threshold signal and to a high threshold signal and generating a low threshold count signal comprising pulses of said pulse signal which exceed said low threshold signal set to eliminate low amplitude noise and generating a high threshold count signal comprising pulses of said pulse signal which exceed said high threshold signal set to pass noise spikes;
means subtracting said high threshold count signal from said low threshold count signal to generate a filtered pulse signal from which low amplitude noise and noise spikes have been eliminated; and
means repetitively generating a pulse count rate signal representative of the pulses in said filtered pulse signal counted in a time interval of a preselected duration.

11. A method of filtering frequency burst noise from a random pulse signal comprising the steps of:
repetitively generating a pulse count rate signal representative of the number of pulses during successive time intervals of selected duration, with the value of the pulse count rate signal for the most recent interval being the current pulse count rate;
generating from previous values of the pulse count rate signal a statistical limit inside of which said current pulse count rate should statistically remain within a preselected probability;
comparing the current value of the pulse count rate signal with said statistical limit; and
generating an output pulse count rate signal having the value of the current pulse count rate when said current pulse count rate is inside of the statistical limit and having the value of the statistical limit when the current pulse count rate is outside said limit.

12. The method of claim 11 wherein generating said statistical limit comprises generating a maximum and minimum statistical limit and clamping said output pulse count rate signal to the value of said maximum statistical limit when said current pulse count rate exceeds the maximum limit and clamping the output pulse count rate signal to the minimum limit with an absolute minimum of zero when said current pulse count rate is less than said minimum limit.

13. The method of claim 12 including overriding clamping of said output pulse count rate signal to said statistical limits when the current pulse count rate remains outside said statistical limits for more than a designated interval.

14. The method of claim 13 including again clamping the output pulse count rate signal to a limiting valve after the current pulse count rate returns to within said limits.

15. The method of claim 13 wherein generating said maximum and minimum statistical limits comprises generating a statistical factor from the average value of the pulse count rate signal over a most recently calculated time period of predetermined duration and adding said statistical factor to said average value of the pulse count rate signal to generate the maximum statistical limit, and subtracting said statistical factor from said average value of the pulse count rate signal to generate the minimum statistical limit.

16. The method of claim 15 wherein said statistical factor is the standard deviation of said average value of the pulse count rate signal multiplied by a multiplication factor.

17. The method of claim 13 including comparing the random pulse signal to a high threshold signal to generate a high threshold pulse signal having only pulses which exceed the high threshold signal;
comparing the random pulse signal to a low threshold signal to generate a low threshold pulse signal having only pulses which exceed the low threshold signal;
subtracting the high threshold pulse signal from the low threshold pulse signal to generate a difference pulse signal which is used to generate said pulse count rate signal.

18. A system for removing noise from a random pulse signal characterized by:

means for repetitively generating a pulse count rate signal representative of pulses in said random pulse signal during time intervals of selected duration, with the pulse count rate signal for the most recent interval being the current pulse count rate interval;

means generating a maximum statistical limit for said current pulse count rate signal from the average value of the pulse count rate signal for a most recent period of time of predetermined duration plus the standard deviation of said average value multiplied by a selected multiplication factor and generating a minimum statistical limit from said average value minus the standard deviation of said average value times said multiplication factor;

means for comparing said current pulse count rate signal with said maximum and minimum statistical limits; and means generating an output pulse count rate signal having the value of said current pulse count rate signal when said current pulse count rate signal is between said statistical limits and for clamping the output pulse count rate signal to the maximum statistical limit when the current pulse count rate signal exceeds the maximum statistical limit and clamping the output pulse count rate signal to the minimum statistical limit when the current pulse count rate signal is less than said minimum statistical limit.

19. The system of claim 18 including means to override said means clamping the output pulse count rate signal to a statistical limit when the current pulse count rate signal has remained outside the statistical limits for more than a designated time interval.

20. The system of claim 19 including means to eliminate from said random pulse signal used in generating the current pulse count rate signal, pulses which have an amplitude less than a preselected low threshold or more than a preselected high threshold.

* * * * *